(12) United States Patent
Roe et al.

(10) Patent No.: US 10,858,595 B2
(45) Date of Patent: Dec. 8, 2020

(54) CHEMICAL SOLUTION AND METHODS OF USING SAME FOR REMEDIATING HYDROGEN SULFIDE AND OTHER CONTAMINANTS IN PETROLEUM BASED AND OTHER LIQUIDS

(71) Applicant: GAPS TECHNOLOGY, LLC, Slidell, LA (US)

(72) Inventors: Cliffton Lee Roe, Harrison Township, MI (US); Linda Schweitzer, Rochester Hills, MI (US)

(73) Assignee: Gaps Technology, LLC, Slidell, LA (US)

( * ) Notice: Subject to any disclaimer, the term of this patent is extended or adjusted under 35 U.S.C. 154(b) by 0 days.

(21) Appl. No.: 16/253,763

(22) Filed: Jan. 22, 2019

(65) Prior Publication Data

US 2019/0153332 A1 May 23, 2019

Related U.S. Application Data

(63) Continuation of application No. PCT/US2018/050913, filed on Sep. 13, 2018.

(60) Provisional application No. 62/539,699, filed on Aug. 1, 2017.

(51) Int. Cl.
| | | |
|---|---|---|
| *B01D 19/00* | (2006.01) | |
| *C02F 1/50* | (2006.01) | |
| *C02F 1/66* | (2006.01) | |
| *C10G 19/02* | (2006.01) | |
| *C10G 19/04* | (2006.01) | |
| *C10G 3/00* | (2006.01) | |
| *C02F 101/10* | (2006.01) | |
| *C02F 103/18* | (2006.01) | |
| *C02F 103/36* | (2006.01) | |
| *C02F 103/10* | (2006.01) | |

(52) U.S. Cl.
CPC .......... *C10G 19/02* (2013.01); *B01D 19/0005* (2013.01); *C02F 1/50* (2013.01); *C02F 1/66* (2013.01); *C10G 3/00* (2013.01); *C10G 19/04* (2013.01); *C02F 2101/101* (2013.01); *C02F 2103/10* (2013.01); *C02F 2103/18* (2013.01); *C02F 2103/365* (2013.01); *C10G 2300/1055* (2013.01); *C10G 2300/207* (2013.01); *C10G 2400/04* (2013.01)

(58) Field of Classification Search
CPC .......... C10G 1/04; C10G 21/08; C10G 21/16; C10G 21/26; C10G 19/02; C10G 2300/207; B01D 19/0005; C02F 1/50; C02F 1/66; C02F 2101/101
See application file for complete search history.

(56) References Cited

U.S. PATENT DOCUMENTS

| | | | |
|---|---|---|---|
| 2,592,523 | A | 4/1952 | Ayers et al. |
| 3,262,753 | A | 7/1966 | Urano et al. |
| 3,708,421 | A | 1/1973 | Rippie |
| 4,417,986 | A | 11/1983 | Connaught et al. |
| 5,635,056 | A | 6/1997 | Brons et al. |
| 7,914,669 | B2 | 3/2011 | Martinie et al. |
| 9,028,679 | B2 | 5/2015 | Morris |
| 2009/0065399 | A1 | 3/2009 | Kocal et al. |
| 2010/0056404 | A1* | 3/2010 | Talley .................. B01D 53/52 507/239 |

FOREIGN PATENT DOCUMENTS

EP  0 432 858 A1  6/1991

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

Mike Nicholson/Tim O'Brian, Baker Petrolite Corporation, "Hydrogen Sulfide in Petroleum", pp. 28 found at www.coqa-inc.org/docs/default-source/meeting-presentations/20010531H25.pdf.

Pohlabein et al., "Experimental Evidence for Abiotic Sulfunzation of Marine Dissolved Organic Matter", frontiers in Marine Science published Nov. 15, 2017, vol. 4, Article 364, pp. 1-11.

* cited by examiner

*Primary Examiner* — Lucas A Stelling
(74) *Attorney, Agent, or Firm* — Carrier Blackman & Associates, P.C.; Joseph P. Carrier; William D. Blackman

(57) ABSTRACT

A treatment process for remediating a contaminated liquid containing more than 5 ppm hydrogen sulfide, includes steps of: preparing a treatment solution containing an aqueous solution containing ≥1 hydroxide compound, in which a collective concentration of the ≥1 hydroxide compound in the aqueous solution is in a range of 35-55 weight percent and the aqueous solution constitutes at least 95% of the treatment solution; adding to the liquid an amount of an treatment solution sufficient to reduce a concentration of hydrogen sulfide in the contaminated liquid to ≤5 ppm based on stoichiometry of reactions between the ≥1 hydroxide compound and the hydrogen sulfide in the liquid; and dispersing the treatment solution in the liquid and allowing the treatment solution to react with the contaminated liquid for a period of time until a concentration of hydrogen sulfide in the liquid is reduced to ≤5 ppm.

18 Claims, No Drawings

CHEMICAL SOLUTION AND METHODS OF USING SAME FOR REMEDIATING HYDROGEN SULFIDE AND OTHER CONTAMINANTS IN PETROLEUM BASED AND OTHER LIQUIDS

CROSS-REFERENCE TO RELATED APPLICATIONS

This application is a continuation of International Patent Application No. PCT/US2018/050913, filed on Sep. 13, 2018, which claims the benefit of priority to U.S. Provisional Patent Application No. 62/539,699, filed on Aug. 1, 2017. The entire subject matter of these priority applications, including specification and drawings thereof, is incorporated by reference herein.

BACKGROUND OF THE INVENTION

1. Field of the Invention

The present disclosure relates to novel, stand-alone chemical treatment solutions and methods of using same for treating and remediating sulfur-containing compounds, primarily including $H_2S$, and other contaminants in petroleum based liquids and other liquids. More particularly, the present disclosure relates to such treatment solutions and methods in which the solutions are chemically reacted with a petroleum based liquid, or other liquid in a stoichiometrically controlled and efficient manner which safely and efficiently remediates the contaminants.

2. Background Art

Sulfur-containing compounds including $H_2S$ have long been recognized as undesirable contaminants in hydrocarbon liquids such as crude oil and liquefied petroleum gas (LPG), as well as in aqueous solutions such as solutions extracted from the earth along with crude oil and natural gas. $H_2S$ is a particularly undesirable contaminant because it is highly toxic, corrosive, etc. and generally hydrocarbon liquids should contain less than five ppm $H_2S$ in order to be acceptable for refining or other processing. Crude oil which is removed directly from the ground may contain $H_2S$ in concentrations or hundreds, thousands or tens of thousands of ppm, but typically will contain ≤2000 ppm $H_2S$, and will generally be somewhat acidic with a pH about 5 to 6.

There are many known methods for remediating sulfur-containing compounds, including $H_2S$, from crude oil and other liquids. For example, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include an amine process involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a preliminary step in sweetening liquid hydrocarbons; and since the used solvent in this process cannot be easily regenerated, caustic scrubbers are most often applied where low acid gas (H2S) volumes must be treated.

A typical caustic treatment used to remediate $H_2S$ in crude oil involves use of a caustic aqueous solution consisting of up to 20% NaOH by weight. The water and caustic material are used to extract $H_2S$ from the crude oil into solution, dissociating $H_2S$ to $HS^-$ ion at higher pH, which shifts the equilibrium of $H_2S$ gas from oil to water. Then, the $HS^-$ can react with sodium to form NaHS (sodium bisulfide), or with $S_2^-$ to form $Na_2S$ (sodium sulfide), for example, plus water as a byproduct according to the following equations. Aqueous sodium bisulfide (NaHS) is a commercially valuable product.

$$H_2S + NaOH \rightarrow NaHS + H_2O \qquad (1)$$

$$NaHS + NaOH \rightarrow Na_2S + H_2O \qquad (2)$$

While the known methods for remediating sulfur-containing compounds, including $H_2S$, from crude oil and other liquids are generally effective, they remain to be improved on. There remains in the art a need for treatment solutions and treatment methods for remediating sulfur-containing compounds, including $H_2S$, from crude oil, other petroleum based liquids, and other liquids, where such solutions and methods are improved in terms of effectiveness in completely remediating the undesired sulfur-containing compounds, as well as in terms of efficiency in quickly remediating the sulfur-containing compounds at a reasonable cost, while generating a minimal amount of byproducts that must be disposed of. There is also a need for flexibility in the ability to perform the method essentially any location, e.g., directly at a well head or an oil field where crude oil is being extracted, while the crude oil is being transported to a refinery, or other location.

SUMMARY OF THE INVENTION

An object of the present invention is to satisfy the above needs in the art.

The present inventors have carefully investigated caustic treatment of petroleum based liquids including crude oil for removing $H_2S$ and other sulfur based contaminants therefrom, and discovered that the conventional method using a caustic aqueous solution consisting of up to 20% NaOH by weight is not efficient, and that the $H_2S$ can be much more efficiently remediated using a more highly concentrated caustic solution, e.g., including as a primary component 45-55 weight percent of one or more hydroxides, such as sodium hydroxide (NaOH) and potassium hydroxide (KOH). $H_2S$ gas is more soluble in oil than in water, so that a rate-limiting step, in the remediation of $H_2S$ from crude oil, is the mass transfer of $H_2S$ from the oil phase into the aqueous phase. Examples of hydrocarbon based liquids which may be treated with the treatment solutions and treatment methods of the present invention include those containing molecules of $CH_9$ to $CH_{32}$.

Generally, the conventional caustic treatment methods are limited to using caustic solutions of only up to 20 weight percent NaOH because the conventional methods are designed and intended to be partly a liquid-liquid extraction, and partly a chemical reaction to convert the $H_2S$ gas to a solid sulfurous species. It is conventionally understood that a certain amount of water is needed to permit the chemical reactants to contact with the crude oil or other petroleum based liquid. The larger amounts of water contained in the conventional caustic treatment solutions permit a greater amount of liquid-liquid extraction. Also, it is known that use of excessive amounts of NaOH may damage the crude oil, as well as metal components used handling the crude oil such as pipes and tanks.

Based on the present inventors' investigations, however, they have discovered that: 1) the liquid-liquid extraction aspect of the conventional methods is actually not that important in comparison to the chemical reaction aspect, e.g., because the initial solubility of $H_2S$ into water, as given by Henry's Law, is low; 2) the larger amounts of water used in aqueous treatment solutions according to the conventional methods also function to dilute the NaOH, which is undesirable because this slows the process needed to produce ionized HS— and $S_2$— ions that allow more of the $H_2S$ contained in the petroleum liquids into solution, and 3) it is much more efficient and effective to remove the sulfur-containing compounds primarily though a chemical reaction process and to a much lesser degree a liquid-liquid extraction though use of a very highly concentrated aqueous treatment solution, provided that the amount of caustic (hydroxide) used is carefully limited within a stoichiometrically-based range. Relative to 1) it should be noted that equation 2 above is reversible, so large amounts of water hydrolyze the sodium sulfide back to NaOH and NaHS. In other words, equation 2 in the reverse direction is a hydrolysis reaction.

Particularly, according to a first aspect hereof, the present inventors have found that a highly concentrated aqueous treatment solution according to an exemplary embodiment of the present invention comprising primarily one or more hydroxides, such as sodium hydroxide (NaOH) and/or potassium hydroxide (KOH) at a collective concentration of 35-55 weight percent, and preferably at least 45 weight percent, in water is very effective for treating petroleum based liquids including crude oil, diesel fuel, etc. for remediating contaminants in the petroleum based liquids, including $H_2S$ and other sulfur-containing contaminants, provided that the amount of the aqueous treatment solution used for treating the liquids is maintained within an appropriate range, which can vary depending on several factors, including the specific composition of the liquid to be treated, reaction time permitted and the type of remediation desired, e.g., whether there are any restrictions on the amounts of precipitate(s) and gases that may be released from the treated petroleum based liquids. Sodium hydroxide is very effective for use in the treatment solution because it does not harm the petroleum based liquids when used in appropriate amounts, and is relatively inexpensive, although use of a combination of hydroxides is advantageous for more completely reacting with most or all of the sulfides in the petroleum based liquids, noting that there are more than 300 types of sulfides, although hydrogen sulfide $H_2S$ is by far the main contaminant that must be remediated. Potassium hydroxide is more effective than sodium hydroxide for reacting with some species of sulfides. Hence, the treatment solution containing potassium hydroxide (KOH) together with the sodium hydroxide achieves a more complete reaction with all of the sulfur contained in the petroleum based liquids in comparison to just using a concentrated solution of sodium hydroxide. Such treatment solution according to the first aspect of the present invention is highly alkaline with a pH of 13-14.

Particularly, the present inventors have found that at a standard dosage rate of 0.25-6.0 ml of the treatment solution/liter of petroleum based liquid, preferably 1.0-5.0 ml of the treatment/liter of petroleum based liquid, is effective for remediating the hydrogen sulfide $H_2S$ in most petroleum based liquids including crude oil, with the specific amount to be used depending on the characteristics of the particular liquid being treated, including its API viscosity, the particular contaminants it contains, the levels of such contaminants, and allowed reaction time (The term API as used herein, is an abbreviation for American Petroleum Institute). At this dosage level, the $H_2S$ is remediated down to less than 5 ppm from initial concentrations of up to 20,000 ppm. When the treatment solution includes sodium hydroxide as the primary hydroxide therein, e.g., at least 90% of all hydroxides in the solution, much of the $H_2S$, e.g., at least 60% is converted into sodium bisulfide (NaHS) according to the reaction (1) above, which remains dissolved in the treated petroleum liquid, and does not create any significant problems that would need to be addressed. Additionally, some of the $H_2S$ is converted into sulfur dioxide ($SO_2$) gas which may be released from the treated petroleum based liquid, depending on the pressure at which the treated liquid is kept. Within the discussed range of 0.25-6.0 ml of the treatment solution/liter of petroleum based liquid, the appropriate dosage rate is substantially, linearly scalable in relation to most or all of the various characteristics. For example, if the amount of $H_2S$ is relatively low, e.g. 20 ppm-100 ppm the dosage rate may be toward the lower end of the range, whereas if the amount of $H_2S$ is relatively high, e.g. 10,000 ppm-20,000 ppm the dosage rate may be toward the higher end of the range, and dosage rates for intermediate amounts f $H_2S$ would be at correspondingly intermediate values of the range. Similar, linear scalability applies based on the viscosity—API of the liquid and reaction times allowed.

The treatment solution may include other components, again, depending on the desired results, as well as on the presence of other contaminants in the petroleum based liquids which are to be remediated. For example, a small amount of a silicate such as potassium silicate and/or barium may be added to the treatment solution to provide an antibacterial function, which may be desirable for killing microbes, including sulfur eating microbes, in the aqueous portion of the treated petroleum based liquid, which includes water in the treatment solution and water produced in the reactions between $H_2S$ and hydroxide(s). For example, 2-10 ml of concentrated 29-45 weight percent potassium silicate aqueous solution may be added per liter of the aqueous treatment solution. Potassium silicate comes in various ratios of $SiO_2:K_2O$, but is often represented as $K_2SiO_3$. Other appropriate antibacterial agent or agents could be used in addition to or as an alternative to silicates, depending on petroleum based liquid being treated. For example, barium (Ba) may be added in an amount of ≤100 ppm of the petroleum based liquid and will provide an antibacterial function. Barium tends to be more appropriate for use with lighter hydrocarbon based liquids including diesel fuel, as well as aqueous solutions, while potassium silicate tends to be more appropriate for use with heavier hydrocarbon based liquids including crude oil. Also, barium is prohibited in petroleum liquids which are to be refined, as barium has an adverse effect on the refining process.

A treatment process according to an exemplary embodiment of the present invention for remediating petroleum based liquids, such as crude oil, to abate $H_2S$ in the hydrocarbon based liquids includes steps of adding a standard dosage of the treatment solution according to the exemplary embodiment discussed above within a range of 0.25-6.0 ml/liter of the petroleum based liquid, preferably within a range of 1.0-5.0 ml/liter of the petroleum based liquid, and permitting the treatment solution to react with the petroleum based liquid for relatively short time period of 15 minutes-24 hours. While the amount of $H_2S$ in petroleum based liquids can range from a few ppm to more than 100,000 ppm, crude oil from the ground typically contains ≤2000 ppm $H_2S$. The discussed standard dosage amount in the exemplary embodiment of the treatment process according to the present invention is generally effective for $H_2S$ up to 20,000 ppm. If the concentration of $H_2S$ is higher than 20,000 ppm it may be necessary to increase standard dosage amount appropriately, which may generally involve linear scalability. The treatment process may include additional steps of collecting, discharging and treating any precipitates and/or gases generated by the s between the treatment solution and the petroleum based liquids.

The most appropriate or optimum dosage amount of the treatment solution within the discussed range will vary, with generally linear scalability, based on a few factors. These factors include: the amount of $H_2S$ contained in the particular petroleum based liquid, the API viscosity of the petroleum based liquid, and the amount of time permitted for reacting treatment solution and the petroleum based liquid. Based on the investigations of the present inventors, they have found that if the dosage amount of the treatment solution according to the exemplary embodiment of the present invention, containing one or more hydroxides such as NaOH, KOH, and possibly an antibacterial agent such as potassium silicate, is appropriately within the standard dosing range, the reaction(s) between the treatment solution and the sulfur containing compounds in the hydrocarbon based liquid, particularly $H_2S$, proceed quickly and efficiently. By contrast, it has also been found that if the amount of the treatment solution added is outside of this range, the reactions between the treatment solution and the sulfur containing compounds in the hydrocarbon based liquid may not proceed quickly and/or efficiently. Further, hydroxides such as NaOH and KOH generally do not have any significantly adverse effects on the treated petroleum based liquids, although application of an excessive amount of the solution may render the treated petroleum based liquid caustic which would be damaging to metals such as steel and aluminum used for containing and transporting the treated liquids.

According to a second aspect of the present invention, the dosage amount of the treatment solution for any given petroleum based liquid may be increased, e.g., to 2 to 5 times the standard dosing rate, if there is a desire to cause the contaminates therein, including sulfur from the $H_2S$, to precipitate out of the treated liquid. At the standard dosing rate of 0.5-6.0 ml of treatment solution/liter of petroleum based liquid, much of the sulfur from the $H_2S$, e.g., at least 60%, is converted into sodium bisulfide (NaHS) according to reactions (1) above, which remains dissolved in the treated petroleum liquid, while some of the $H_2S$ is converted into sulfur dioxide ($SO_2$) gas which may also remain in the treated petroleum based liquid, depending on the pressure at which the treated liquid is kept. Having essentially all of the sulfur from the $H_2S$ remain in the treated petroleum liquid may be a desired result, e.g., it may be desirable to prevent any solids/precipitates from separating out of the treated petroleum liquid because these could cause problems such as build up in and scaling on the structures in which the treated liquid is being transported or stored, and it may be desirable to prevent airy gases such as sulfur dioxide ($SO_2$) from being released from the treated liquid to avoid having to capture, treat and/or release same. However, there may be situations in which it is desirable to cause sulfur from the $H_2S$, as well as other contaminants, to precipitate out of the treated liquid for various reasons. For example, the US Government has adopted guidelines that limit the amount of sulfur contained in fuels, and correspondingly it may be necessary to precipitate some or all of the sulfur from the treated liquids in order to meet the guidelines. Further, the sulfur compounds and/or other contaminates remaining in the treated liquid may create difficulties or complications for further processing and/or combustion of the treated liquids. For aqueous solutions to be discharged to a wastewater treatment facility or to be for purposes such as watering crops it would normally be desirable or necessary to remove the remediated sulfur compounds and other contaminants therefrom. Also, depending on how much of the treatment solution is used in excess of the standard dosing rate, this may generate different precipitates which separate out of the treated liquid so that the outcome may be controlled in desired manners, e.g., at 2 times the standard dosing rate a hydrate of sodium sulfide such as $Na_2S.9H_2O$ may precipitate out of the treated liquid according to the reaction (2) above, while at a higher dosage rate of 3 to 5 times the standard dosage rate, this may cause elemental sulfur to precipitate out of the treated liquid. Further, increased dosage rates will generally speed up the reaction rate for remediating the $H_2S$ in the petroleum liquid or aqueous solution to some extent if that is desired. By increasing the dosage rate of the treatment solution appropriately, e.g., from 2 to 5 times the standard dosage rate, it is possible to more quickly remediate the petroleum based liquid or aqueous solution and to cause some or most of the sulfur and other contaminants to precipitate out of the treated liquid in a desired form.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Treatment Solution and Treatment Methods—First Exemplary Embodiment

According to a first exemplary embodiment of the present invention, there is provided a treatment solution and methods of using same for treating hydrocarbon—petroleum based liquids such as crude oil, diesel fuel, etc. to remediate hydrogen sulfide ($H_2S$), other sulfur-containing compounds, and other contaminants therein. The treatment solution may also be used in remediating aqueous solutions containing $H_2S$ and other contaminants, such as water extracted from the ground with crude oil and natural gas. Remediating $H_2S$ is a primary focus and advantage of the first exemplary embodiment because $H_2S$ is very toxic and corrosive, is typically present at elevated levels in crude oil and aqueous solutions extracted from the ground with crude oil or natural gas, and the content of $H_2S$ in petroleum based liquids and aqueous solutions is highly limited a regulated. Other contaminants which may be remediated and/or removed using the treatment solution according to the first exemplary embodiment include total suspended solids (TSS), bottom sediment and water (BSW), ammonia, heavy metals, etc.

The treatment solution according to the first exemplary embodiment is aqueous based and may primarily include one or more hydroxides, such as sodium hydroxide (NaOH)

and potassium hydroxide (KOH), at a collective, high concentration of 35-55 weight percent, and preferably at least 45 weight percent, in water, and possibly one or more other components depending on the specific characteristics of the petroleum based liquid being treated, and other factors relating to the treatment. Characteristics of the petroleum based liquids include the API viscosity thereof, the particular contaminants, including $H_2S$ to be treated, and the amounts of such contaminants contained in the petroleum based liquid. While $H_2S$ is the main contaminant which must typically be remediated in petroleum based liquids, it may be necessary or desirable to also remediate the other contaminants besides $H_2S$ in the petroleum based liquids, and the other contaminants may also create complications for remediating the $H_2S$. Even in relation to one type of contaminated liquid such as crude oil or aqueous solutions extracted from the earth along with crude oil and natural gas, characteristics can vary greatly, e.g., crude oil extracted from a given well at a given time on a given day, can contain significantly different amounts of $H_2S$ and different types and amounts of other contaminants compared to crude oil extracted from the same well on the same day, but at a different time. Other important factors pertaining to the treatment process include viscosity of the liquid, permitted reaction time and the type of remediation desired, e.g., whether there are any restrictions on the amounts of precipitate(s) and/or gases that may be released from the treated petroleum based liquids, whether it is desired to generate a certain precipitate or gas via the treatment, etc. as discussed herein. Generally, much of the $H_2S$ in a petroleum based liquid, such as crude oil, is a gas which is dissolved in the liquid. $H_2S$ gas has much greater solubility in petroleum liquids than in water, and at the high pressures at which crude oil exists underground, it is possible for the crude oil to have thousands and tens of thousands of ppm $H_2S$ therein, although when the crude oil is brought up to ambient atmospheric pressure much of the $H_2S$ gas may be released from the crude oil according to Henry's Law, and hence the need to abate the $H_2S$ and prevent it from being released.

It is conventionally understood that an aqueous solution of hydroxide such as NaOH will react with $H_2S$ in petroleum based liquids such as crude oil. Generally, $H_2S$ is an acidic compound, crude oil as extracted from the ground and containing a typical amount of $H_2S$, e.g. ≤2000 ppm which is mostly in the form gas dissolved in the crude oil, has a moderately acidic pH of about 5-5.5. Gaseous $H_2S$ does not exist in solution above a pH of about 7. The treatment solution according to the first exemplary embodiment of the invention contains a large percentage hydroxide(s), is basic with a pH of about 13-14, and when added to the petroleum liquid increases the pH thereof. The water and hydroxide are used to extract $H_2S$ from the crude oil into the water, dissociating $H_2S$ to HS— ion at higher pH, which shifts the equilibrium of $H_2S$ gas from oil to water. Then, the HS— can react with sodium to form NaHS (sodium bisulfide), or with $S_2$— to form $Na_2S$ (sodium sulfide), for example, plus water as a byproduct according to the following equations. Aqueous sodium bisulfide (NaHS) is a commercially valuable product.

$$H_2S + NaOH \rightarrow NaHS + H_2O \quad (1)$$

$$NaHS + NaOH \rightarrow Na_2S + H_2O \quad (2)$$

Conventional methods for treating crude oil with hydroxide solutions to remediate $H_2S$ in the crude oil involve use of caustic solutions containing up to 20 weight percent NaOH, because the conventional methods are designed and intended to be partly a liquid-liquid extraction, and partly a chemical reaction to convert the $H_2S$ gas, as extracted into the water from the oil, into a solid sulfurous species. It is conventionally understood that a certain amount of water is needed to permit the chemical reactants to come into contact with the crude oil or other petroleum based liquid. The larger amounts of water contained in the conventional caustic treatment solutions permit a greater amount of liquid-liquid extraction. Also, it is known that use of excessive amounts of NaOH may damage the crude oil, as well as metal components used handling the crude oil such as pipes and tanks.

The present inventors have carefully investigated treatment of petroleum based liquids including crude oil for removing $H_2S$ and other sulfur based contaminants therefrom using an aqueous hydroxide solution, and discovered that the conventional methods, using a caustic aqueous solution consisting of up to 20 weight percent sodium hydroxide (NaOH) are not efficient, and that the $H_2S$ can be much more efficiently remediated using a more highly concentrated, aqueous hydroxide solution; e.g., including as a primary component 35-55 weight percent, and preferably at least 45 weight percent, of one or more hydroxides, such as sodium hydroxide (NaOH) and potassium hydroxide (KOH). $H_2S$ gas is more soluble in oil than water, so that a rate-limiting step in the remediation of $H_2S$ from crude oil is the mass transfer of $H_2S$ from the oil phase into the aqueous phase. Based on the present inventors' investigations, however, they have determined that:

1) the liquid-liquid extraction aspect of the conventional methods is actually not that important in comparison to the chemical reaction aspect, e.g., because the initial solubility of $H_2S$ into water, as given by Henry's Law, is low;

2) the larger amounts of water used in aqueous treatment solutions according to the conventional methods also function to dilute the NaOH, which is undesirable because this significantly slows the process needed to produce ionized HS— and $S_2$— ions that allow more of the $H_2S$ contained in the petroleum liquids to go into the water, and 3) it is much more efficient and effective to remove the sulfur-containing compounds primarily through a chemical reaction process and to a much lesser degree a liquid-liquid extraction through use of a the aqueous treatment solution of the first exemplary embodiment containing a very high concentration of hydroxide(s), provided that the amount of caustic (hydroxide) used is carefully limited within a controlled range, which accounts for factors including stoichiometry of intended reactions and desired rate of reaction.

Although there are many different common compounds of hydroxide (OH) that may be used in the treatment solution according to the first exemplary embodiment, many of these have undesirable characteristics associated therewith, including that they would introduce other contaminants into the treated petroleum based liquids which may require further remediation step(s), high cost, etc. For example, iron, other metals, calcium, barium, and chlorides interfere with heat and cracking in refining processes and would have to be removed from treated crude oil before it is refined. On the other hand sodium, potassium, magnesium, manganese, are permitted in refining processes as long as the content is not too high, e.g., <250 ppm. Sodium hydroxide is very effective for use in the treatment solution because it does not harm the petroleum based liquids when used in appropriate amounts. For example, if NaOH is used exclusively or primarily as the hydroxide in the treatment solution at a concentration of about 50 weight percent according to the first embodiment, and the solution is used at a standard dosing rate to treat crude oil in a treatment process according to an exemplary embodiment of the present invention as discussed herein, this may increase sodium content in the treated crude oil from about 10 ppm to 50 ppm. At such content level the sodium does not detrimentally affect the crude oil to any appreciable extent. Further, the treatment solution does not introduce any other contaminants into the crude oil that would require further remediation step(s), and the treatment solution is relatively inexpensive. Potassium hydroxide (KOH), magnesium hydroxide (Mg(OH)$_2$), and manganese hydroxide (Mn(OH)$_2$, Mn(OH)$_4$) are other suitable hydroxides.

Use of a combination of hydroxides is advantageous for more completely reacting with most or all of the sulfides in the petroleum based liquids, noting that there are more than 300 types of sulfides, although hydrogen sulfide H$_2$S is by far the main contaminant that must be remediated. Potassium hydroxide, for example, is more effective than sodium hydroxide for reacting with some species of sulfides. Hence, if the treatment solution according to the first embodiment contains some amount of potassium hydroxide (KOH) together with the sodium hydroxide, the treatment solution achieves a more complete reaction with all of the sulfur contained in the petroleum based liquids in comparison to just using a treatment solution of sodium hydroxide. For example, the treatment solution according to the first embodiment may contain a blend of 70-99.9 parts NaOH: 0.1-30 parts KOH, at a total concentration of 35-55 weight percent, and preferably at least 45 weight percent in water. Again, such treatment solution according to the first exemplary embodiment of the present invention is highly alkaline with a pH of 13-14.

The treatment solution may include other components, again, depending on the presence of other contaminants in the petroleum based liquids which are to be remediated, as well as on the desired results of the treatment process. For example, a small amount of a silicate such as potassium silicate may be added to the treatment solution to provide an anti bacterial function, which may be desirable for killing microbes, including sulfur eating microbes, in the aqueous portion of the treated petroleum based liquid, including water in the treatment solution and water produced in the reactions between H$_2$S and the hydroxide(s). For example, a dosage of 2-10 ml of concentrated 29-45 weight percent potassium silicate aqueous solution may be added per liter of the aqueous treatment solution to achieve such function. Potassium silicate comes in various ratios of SiO$_2$:K$_2$O, but is often represented as K$_2$SiO$_3$. Other appropriate antibacterial agent or agents could be used in addition to or as an alternative to silicates, depending on the particular liquid being treated. For example, barium (Ba) may be added in an amount of ≤100 ppm of the liquid being treated, whether a petroleum based liquid or aqueous solution, and will provide an antibacterial function. Barium tends to be more appropriate for use with lighter hydrocarbon based liquids including diesel fuel and for treating contaminated aqueous solutions, while potassium silicate tends to be more appropriate for use with heavier hydrocarbon based liquids including crude oil. Also, barium is prohibited in petroleum liquids which are to be refined as barium has an adverse effect on the refining process. Therefore, barium is not preferred in the practice of the present invention.

Additionally, petroleum based liquids such as crude oil tend to have various impurities and various amounts of impurities, many of which must or should be remediated along with the H$_2$S and other sulfur containing contaminants. These impurities include ammonia (NH$_3$), which tends to accumulate in the water produced via the reactions (1), (2), as well as various solid impurities which are often referred to as "rag", which typically include various minerals and organic matters. The accumulated ammonia, which is toxic and undesirable, may be discharged as a gas from the liquid to be treated.

For remediating ammonia the pH of the aqueous portion of the liquids in the treatment cell may be adjusted to a level such as 8.5-7.0, at which the ammonia is converted to ammonium ion (NH$_4$+) and thereby prevents the ammonia from being released in gas form. However, reducing the pH of the treatment solution may also affect the reactions between hydroxide and H$_2$S. At lower pH, such as 7.0-8.5, S$^{2-}$ ions in the water are converted to HS$^-$ ions, which is one step closer to H$_2$S, so that there will be more residual H$_2$S in the produced water when the pH is adjusted lower and less residual H$_2$S in the produced water when the pH is adjusted higher. Hence, there should be some consideration of optimization of pH so as to achieve a desired balance between mitigation of H$_2$S on the one hand versus mitigation of NH$_3$ on the other hand. With appropriate dosing the treatment solution according to the first exemplary embodiment should produce a pH of around 7-10 in the petroleum liquid being treated, whereas if ammonia is a concern, the pH should not be raised above 8.5. Hence, there is some overlap in the appropriate pH ranges for remediating both H$_2$S and NH$_3$, and depending on which of these contaminants is present and at what levels the pH can be suitably adjusted to achieve an optimum result. Of course, remediation of H$_2$S is a primary focus of the invention, and would normally be a primary factor in determining the appropriate pH for the treated liquid. It should also be noted that overdosing with treatment solution may increase the pH above 9, and thus increases the risk of producing more ammonia gas. Hence this is another reason why the dosage rate for the treatment solution should be maintained within a standard range as discussed herein.

An alternative approach for remediating ammonia in the produced water is to remove the ammonia from the aqueous portion of the liquid in the treatment cell via an ion exchange process.

In regards to the rag impurities in the petroleum based liquid, these may be conveniently and efficiently removed from the hydrocarbon based liquid using the same treatment solution and treatment processes according to the exemplary embodiments of the present invention as used for reacting with the H$_2$S and other sulfur-containing compounds in the hydrocarbon based liquid and aqueous solutions, although this will typically require a higher dosage rate of the treatment solution as compared to the appropriate dosage rate for treating H$_2$S and other sulfur-containing compounds. For example, if the treatment solution according to the exemplary embodiment is added to the liquid being treated at 2 or 3 times the standard dosage rate for treating H$_2$S and other sulfur-containing compounds, the excess treatment solution will more surely cause most or all of the rag impurities to precipitate out of the treated liquid as discussed herein. The treatment solution functions to separate the rag components from the hydrocarbon based liquid and transfer these components into the produced water, from which they may precipitate or settle to the bottom of the treatment cell where they can be easily removed for further treatment, sale or discarding.

Treatment Processes According to the Present Invention
Treatment of Petroleum Based Liquids According to an important aspect of the present invention, the present inventors have found that a treatment solution according to the first exemplary embodiment of the present invention may be added to petroleum based liquids at a controlled dosage amount, whereby the treatment solution directly reacts with $H_2S$ and is very effective for remediating contaminants in the liquids, including $H_2S$ and other sulfur-containing contaminants, provided that the dosage amount of the aqueous treatment solution is maintained within an appropriate range, which can vary depending on a matrix of several factors such as discussed herein. When the alkaline treatment solution according to the first exemplary embodiment is added to the crude oil, it increases the pH of the crude oil and the hydroxide(s) therein quickly and efficiently remediate the $H_2S$ down to 5 ppm or less, e.g., if NaOH is the hydroxide it will react with the $H_2S$ according to the equations (1), (2) discussed above to generate NaHS (sodium bisulfide) and/or $Na_2S$ (sodium sulfide).

The invention provides unexpected results in that it is counterintuitive to limit the amount of water in the remediation process according to the exemplary embodiment of the present invention because this limits chemical contact with the contaminants in the petroleum based liquids such as crude oil, e.g., the chemical reactants are mostly ionic and readily dissolve in water, but not in the petroleum based liquids such as crude oil. However, the present inventors have unexpectedly found that since the chemical reactions involved, e.g., equations (1), (2) above, produce water, the produced water can readily diffuse through the oil as it is produced because the caustic solution has good migration tendencies through many of the petroleum based liquids being treated, and that it is unnecessary to initially provide any significant amount of water in the treatment process apart from the water in the treatment solution in order for the petroleum-based liquid to be effectively treated for remediation of sulfur-containing contaminants, including $H_2S$. An exemplary treatment process according to the present invention as discussed herein is not a wash type process, but rapid chemical reactions that greatly reduce the mass transfer of the gas to aqueous phase.

Generally, the treatment solution according to the first exemplary embodiment has good migration tendencies in petroleum based liquids with low or moderate viscosities, e.g., above an API viscosity of 25°, and will readily disperse therein. Dispersion of the produced water and the treatment solution throughout the liquid being treated may be improved with a relatively small amount of mixing, e.g., via an impeller rotating at low-medium speeds such as 50-200 rpm and/or heating.

What the treatment process according to the present invention does differently, in comparison to the conventional treatment processes, is to essentially reduce the initial amount of water to the minimum effective amount, while carefully limiting the amount of hydroxides and possibly other reactants in the treatment solution to appropriate amounts, for reacting with the contaminants in the petroleum based liquid being treated based on considerations of stoichiometry, desired reaction rate and specific result desired, and by this the efficiency of the process is increased in multiple aspects. One aspect is that excessive amounts of the treatment solution are not used and wasted. Another aspect of increased efficiency is that more of the petroleum-based liquid may be treated for any given size treatment batch/tank because there is less amount of water in the batch/tank. As another example, the volume of resulting waste that must be removed and possibly treated is reduced as well. Further, as a main component of the treatment solution, highly concentrated aqueous solutions of hydroxides are commercially available in appropriately high concentrations for direct use in the treatment solution, e.g., concentrated aqueous solutions of NaOH are available in concentrations of 47 weight percent NaOH (17.6 M) and 50.5 weight percent NaOH (19.4 M), which may be directly used in the exemplary embodiment of the present invention because no efforts need be made to dilute the commercially available NaOH solutions to a lesser concentration with water.

A first treatment process according to an exemplary embodiment of the present invention for remediating petroleum based liquids, such as crude oil, by abating $H_2S$ in the hydrocarbon based liquids includes steps of adding a standard dosage of the treatment solution according to the exemplary embodiment discussed above within a range of 0.25-6.0 ml/liter of the petroleum based liquid, preferably within a range of 1.0-5.0 ml/liter of the petroleum based liquid, and permitting the treatment solution to react with the petroleum based liquid for time period of 15 minutes-24 hours. While the amount of $H_2S$ in petroleum based liquids can range from a few ppm to more than 100,000 ppm, crude oil from the ground typically contains ≤2000 ppm $H_2S$. The discussed standard dosage amount in the exemplary embodiment of the treatment process according to the present invention is generally effective for $H_2S$ us to 20,000 ppm. If the concentration of $H_2S$ is higher than 20,000 ppm it may be necessary to increase standard dosage amount appropriately, which may generally involve linear scalability. The first exemplary treatment process may include additional steps of collecting, discharging and treating any precipitates and/or gases generated by the reactions between the treatment solution and the petroleum based liquids.

The most appropriate or optimum dosage amount of the treatment solution within the discussed range ill vary, with generally linear scalability, based on a few factors. These factors include: the amount of $H_2S$ contained in the particular petroleum based liquid, the API viscosity of the petroleum based liquid, and the amount of time permitted for reacting the treatment solution and the petroleum based liquid. For example, if the treatment liquid a medium to light crude oil and the amount of $H_2S$ is relatively low, e.g. 20 ppm-100 ppm the most appropriate dosage rate may be toward the lower end of the range, whereas if the amount of $H_2S$ is relatively high, e.g. 10,000 ppm-20,000 ppm the most appropriate dosage rate may be toward the higher end of the range, and most appropriate dosage rates for intermediate amounts of $H_2S$ would be at correspondingly intermediate values of the range. The first exemplary treatment process may be conveniently carried out essentially wherever the contaminated liquids may be present, e.g., in open bodies of the liquids, in conjunction with a transport tanker or other vessel in which the liquids are being transported, at a wellhead where the liquids are being extracted from the ground, in open or closed tanks, in an enclosed pipeline through which the contaminated water or other liquid is being transported, etc.

Similarly, as the viscosity of the petroleum based liquid increases, or the API viscosity of the liquid decreases, the most appropriate amount of the treatment solution will generally increase. Again, the treatment solution, including hydroxide(s), has good migration characteristics when added to thin, low viscosity petroleum based liquids and can readily disperse throughout the liquid, although the liquid could be heated and/or mixed to increase the rate of dispersion. For medium viscosity petroleum based liquids with an API viscosity of 33° or more, stirring at low—moderate speeds, e.g., 100-300 rpm, and/or heating to temperatures below the flash point of the liquids is helpful to disperse the treatment solution in the liquids, while for highly viscous petroleum based liquids with an API viscosity of 15° or less, heating to temperatures below the flash point of the liquids together with mixing at low—moderate speeds is generally required to properly disperse the treatment solution in the liquids. Different types of petroleum liquids include light crude oil (API viscosity ≥31.1°), medium crude oil (API viscosity between 23.3° and 31.1°), heavy crude oil (API viscosity <23.3°), bunker fuel (API viscosity approximately 6°), diesel fuel (API viscosity approximately 34°), etc. Petroleum based liquids with an API viscosity of less than 10° are heavier than water, are extremely viscous and will sink in water. In terms of the dosage rates for the treatment solution, if the petroleum based liquid has a typical amount of $H_2S$ of 2,000 ppm or less, for low viscosity (API viscosity of 33° or more) petroleum based liquids such as diesel fuel a most appropriate dosage amount may be 1-2 ml/liter of petroleum based liquid, while for medium viscous liquids (API viscosity of 20°-30°) such as light, medium or heavy crude oil, a most appropriate dosage amount may be 2-3.5 ml/liter of petroleum based liquid, and for highly viscous petroleum based liquids (API viscosity of 15° or less), such as bunker fuel, a most appropriate dosage amount may be 5-7 ml/liter of petroleum based liquid.

As far as reaction time permitted, there may no restriction thereon and the treatment solution may be permitted to react for any suitable time such as 15 minutes-24 hours at a most appropriate dosage rate based on the concentration—amount of $H_2S$ contained in the particular liquid and the API viscosity of the liquid. However, there may be situations where reaction time is limited, e.g., limited to an amount of time required to transport the petroleum based liquid to a desired destination for unloading after the treatment solution has been added to the liquid, limited to less than 30 minutes based on desired productivity, etc. In such situations with limited reaction times, a most appropriate dosage amount to be added to the liquid according to a treatment process of the present invention may be increased above a dosage amount determined based on based on the concentration—amount of $H_2S$ contained in the particular liquid and the API viscosity of the liquid, e.g., increased to an amount that will assure essentially complete remediation of the $H_2S$ contained in the particular liquid within the time permitted. For example, if a normal reaction time required to fully remediate $H_2S$ contained in the particular liquid is 2 hours, but the permitted reaction time is only 1 hour, a most appropriate dosage amount may be double a most appropriate dosage amount determined based on the concentration amount of $H_2S$ contained in the particular liquid and the API viscosity of the liquid. According to one study performed by the present inventors, when a crude oil containing about 1000 ppm $H_2S$ was treated with a treatment solution according to the exemplary embodiment of the invention containing NaOH as approximately 99% of the total hydroxides therein, when 0.25 ml of the treatment solution was added/liter of the crude oil it took approximately 12 hours to remediate or abate the $H_2S$ down to 0 ppm, whereas if 5 ml of the treatment solution was added/liter of the crude oil it took approximately 30 minutes to abate the $H_2S$ down to 0 ppm. Essentially the same results were obtained with a treatment solution according to the exemplary embodiment of the invention containing KOH as approximately 99% of the total hydroxides therein.

The present inventors have found at the first treatment method according to the exemplary embodiment of the present invention is very effective for remediating the hydrogen sulfide $H_2S$ in most petroleum based liquids including crude oil. At an appropriate dosage rate within the standard range of 0.25-6 mil/liter of petroleum based liquid, preferably within a range of 1.0-5.0 ml/liter of the petroleum based liquid, and a reaction time of 15 minutes to 24 hours according to the exemplary embodiment of the present invention, the $H_2S$ is remediated down to less than 5 ppm from initial concentrations of up to 20,000 ppm. Addition of the treatment solution to the petroleum based liquid at the appropriate dosage rate will raise the pH of the liquid, e.g., crude oil at a pH of about 5.0-5.5 will increase to a pH of about 5.8-6.2, which changes the valence of the dissolved $H_2S$ gas in the liquid and permits substantially all of the $H_2S$ to be abated and changed into other compounds which are not toxic.

At a dosage rate of less than 0.25 ml/liter of the contaminated petroleum based liquid, the hydroxide(s) in the treatment solution may not efficiently react with $H_2S$ and other sulfur containing compounds in the hydrocarbon based liquids, the contaminants may not be completely abated, and the treated petroleum based liquids may not meet government-established, contaminant limits. On the other hand, if the amount of the treatment solution added/liter of petroleum based compound is more than 6.0 ml, the additional amount of the treatment solution may not improve the efficiency of remediating the $H_2S$ and other sulfur containing compounds in the hydrocarbon based liquids per se, and may simply increase the cost of the treatment. However, addition of an excessive amount of the treatment solution above the standard dosage rate may be desirable for various reasons, such as those discussed herein. In terms of amounts of contaminants removed especially, and perhaps in terms of the time required for the treatment, there is generally no significant improvement in the remediation of $H_2S$ in the compound using more than 6.0 ml of the treatment solution/liter of petroleum based compound in comparison to treatment involving more than 6.0 ml of the treatment solution/liter of the same petroleum based compound. However, unless the dosage rate is greatly exceeded, e.g., by more than 5 times the normal dosage rate for the particular petroleum based liquid, it is unlikely that the excess/residual caustic solution will harm the petroleum based compound to any appreciable extent. However, at more than 10 times the normal dosage rate for the particular petroleum based liquid, the treated liquid is likely to be caustic and have a relatively high pH, which can be undesirable because it may corrode metals including steel and aluminum. Thus, it may be important to properly dose the amount of treatment solution used in the treatment processes according to the present invention in order to most efficient and cost effective, and in order to achieve specifically desired results. However, even if the dosage amount used in a treatment process according to the present invention is moderately or significantly excessive in comparison the optimum dosage amount based on stoichiometry and other considerations, this should not create any significant problems for the treated liquids.

The present inventors have found that if the reactions involved in the treatment process are properly controlled by dosing the treatment solution within the standard range of 0.25-7 ml/liter of petroleum based liquid, preferably within a range of 1.0-5.0 ml/liter of the petroleum based liquid, and a reaction time of 15 minutes to 24 hours according to the exemplary embodiment of the present invention, then the NaOH in the treatment solution will react with the sulfur preferentially over other species in the petroleum based liquids such as crude oil and will not harm the petroleum based liquids. For example, the present inventors have found that a dose of the treatment solution within the standard range does not harm the petroleum based liquids and completely remediates the $H_2S$ contained therein down to 5 ppm or less, and typically down to substantially 0 ppm. Any residual caustic waste resulting from the method according to the first aspect of the invention will typically not harm the petroleum based compounds because it will be a relatively small amount and also tends to separate from the hydrocarbon based liquids bottom of the treatment cell, thereby no longer making contact with the oil, and may be readily separated from the petroleum based compounds.

When the treatment solution contains sodium hydroxide as the primary hydroxide contained therein, e.g., at least 90% of the hydroxides, much of the $H_2S$, e.g., at least 60% is converted into sodium bisulfide (NaHS) according to the reaction (1) above, which remains dissolved in the treated petroleum liquid, and does not create any significant problems that would need to be addressed, e.g., this would not prevent the crude oil from being accepted as sweet, high grade crude oil.

Additionally, some of the $H_2S$ may be converted into sulfur dioxide ($SO_2$) gas (upon stirring which allows air containing oxygen to get into the oil, which may released from the treated petroleum based liquid, depending on the pressure under which the treated liquid is kept. Generally, hydroxides including NaOH are reducing agents and would not produce sulfur dioxide or elemental sulfur if the treated petroleum liquid is not exposed to air. However, if the oil is exposed to air, the sulfide/bisulfide can be oxidized to $SO2$ or elemental sulfur. All sulfide species are the same oxidation state (−2) and NaOH is not changing the oxidation state. Similar reactions would occur for other hydroxides included in the treatment solution. Relative to any such sulfur dioxide ($SO_2$) gas, as well as any other gases that may be released from the treated crude oil, it would be necessary as a safety measure to provide some head space in a closed tank or other closed vessel transporting the treated liquid to assure that the pressure does not get excessively high. Although the treatment process according to the exemplary embodiment of the present invention will increase the content of sodium (Na) in the treated liquid when the treatment solution contains sodium hydroxide as the primary hydroxide contained therein, this does not cause any problems or detrimental effects when the crude oil is refined and subsequently combusted. For example, a study performed showed that for crude oil with a starting concentration of about 8 ppm Na and about 1000 ppm $H_2S$, after treatment using 3 ml of the treatment solution/liter of the crude oil, the final concentrations were about 40 ppm Na and 0 ppm $H_2S$. Sodium has no adverse effects in the crude oil refining process as long as the concentration of sodium is generally ≤250 ppm.

Moreover, the abatement of the $H_2S$ by the treatment process according to the exemplary embodiment of the present invention is desirably non-reversible, unlike $H_2S$ abatement achieved by a conventional amine treatment process which uses an amine such as monoethanolamine (MEA) or triazine for treating $H_2S$ in crude oil. For example, with the conventional amine treatment process, while the $H_2S$ may be initially remediated or abated down to acceptable levels, the sulfur contained in the treated oil may revert back to $H_2S$ over time, especially if the treated oil is heated, which is undesirable. Conversely, when crude oil which initially contained about 1000 ppm $H_2S$ was treated according to the exemplary embodiment of the invention at a dosing rate of 3 ml/liter of oil and the $H_2S$ was abated down to about 0 ppm and essentially none of the sulfur precipitated out of the oil, the treated crude oil was heated up to 180° F. or 82.2° C. for 1-3 hours, the resulting oil still contained about 0 ppm $H_2S$ as essentially none of the sulfur compounds(s) in the treated liquid reverted back to $H_2S$.

To any extent that the petroleum liquid being treated contains ammonia ($NH_3$) as another impurity, the treatment process according to the exemplary embodiment applying the treatment solution according to the exemplary embodiment at the standard dosing rate discussed above will normally increase the pH of the petroleum liquid being treated, e.g., crude oil, to a value of 7.0 or less. At this level any ammonia in the liquid will be converted to ammonium ($NH_4^+$), which desirably remains in solution, unlike ammonia which may be released as a toxic gas, and ammonium does not cause any significant problems or complications when further treating the petroleum liquid, e.g., in a refining process, or combusting the treated liquid.

To any extent that the petroleum liquid being treated contains any rag impurities, these will for the most part also remain in solution when the liquid is treated in the first treatment process according to the exemplary embodiment applying the treatment solution according to the exemplary embodiment at the standard dosing rate discussed above. This may be desirable or undesirable as some rag impurities may create problems or complications when further treating the petroleum liquid, e.g., in a refining process, or combusting the treated liquid. However, the present invention makes it possible to cause sulfur containing compounds, rag impurities, and other remaining impurities remaining in the treated petroleum liquid to precipitate out of the liquid if so desired.

A second treatment process according to an exemplary embodiment of the present invention involves increasing the dosage amount of the treatment solution for any given petroleum based liquid, e.g., from 2 to 5 times the standard dosing rate, if there is a desire to cause the contaminates therein, including sulfur from the $H_2S$ and rag impurities, to precipitate out of the treated liquid and/or be released from the treated liquid as gas such as sulfur dioxide. While it is certainly possible to increase the dosage amount above 5 times the standard dosing rate in the second treatment process according to the present invention, generally there is no significant benefit in doing so.

Again, in the first exemplary embodiment of a treatment process according to the present invention involving the standard dosing rate of 0.25-6.0 ml, preferably 1.0-5.0 ml, of treatment solution according to the exemplary embodiment/liter of petroleum based liquid, much of the sulfur from the $H_2S$, e.g., at least 60%, is converted into sodium bisulfide (NaHS), which remains dissolved in the treated petroleum liquid, while some of the $H_2S$ may be converted into sulfur dioxide ($SO_2$) gas which may also remain in the treated petroleum based liquid, depending on the pressure at which the treated liquid is kept. Having essentially all of the sulfur from the $H_2S$ and the rag impurities remain in the treated petroleum liquid may be a desired result, e.g., it may be desirable to prevent any solids/precipitates from separating out of the treated petroleum liquid because these could cause problems such as build up in and scaling on the structures in which the treated liquid is being transported or stored, and it may be desirable to prevent any gases such as sulfur dioxide ($SO_2$) from being released from the treated liquid to avoid having to capture and remediate same, e.g., in a scrubbing process.

On the other hand, there may be situations in which it is desirable to cause sulfur from the $H_2S$, as well as other contaminants including rag impurities, to precipitate out of the treated liquid or be released as gas from the treated liquid for various reasons. For example, the US Government has adopted guidelines that limit the amount of sulfur contained in fuels, and correspondingly it may be necessary to precipitate some or all of the sulfur from the treated liquids and/or release the sulfur from the treated liquid as a gas such as sulfur dioxide in order to meet the guidelines. Also, it may be desirable to cause the rag impurities and other contaminants such as metals to be precipitated out of the petroleum based liquid being treated, especially if these are likely to cause undesired problems or complications in further processing or combustion of the liquids, and by increasing the dosage rate of the treatment solution by 2 to 5 times the standard dosing rate in the treatment process according to the second exemplary embodiment of the present invention, this is effective to cause the rag impurities and other contaminants to precipitate out of the treated liquid. Further, depending on how much the standard dosage amount of the treatment solution is increased for the treatment process, this may be controlled to generate different precipitates and gases which separate out of the treated liquid.

Increasing the dosage rate of the treatment solution by 2 to 5 times the standard dosing rate according to the second exemplary embodiment of the treatment process according to the invention will increase the pH of the treated liquid to a level above that which it would be if the liquid was treated in the first exemplary embodiment
involving an appropriate dosage within the standard dosage range. For example, if the first treatment process applies an appropriate dosage within the standard dosage range, the pH of the treated liquid is likely to be in a range of 6-7. On the other hand, if the second treatment process applies twice the appropriate dosage within the standard dosage range, the pH of the treated liquid is likely to be in a range of 7-8, if the treatment process applies three times appropriate dosage within the standard dosage range, the pH of the treated liquid is likely to be in a range of 8-8.5, and similar pH increases when the treatment process applies four or five times the appropriate dosage within the standard dosage range. To any extent that the liquid contains ammonia, again, it would not be desirable to increase the pH above 8.5 as this may result in release of ammonia gas. Thus, if the treatment solution according to the exemplary embodiment includes NaOH as the primary hydroxide therein, e.g., NaOH constitutes at least 90% of the hydroxides therein, and the treatment solution is applied at 2 times the appropriate dosing rate within the standard dosing range for the liquid, this will increase the pH of the treated liquid to a value in a range of about 7.2-8.0, and at such pH, much of the $H_2S$ and other sulfur containing contaminants in the treated liquid will be converted to a hydrate of sodium sulfide such as $Na_2S.9H_2O$ according to the reactions (1) and (2) above, and should precipitate out of the treated liquid. However, if the treatment process according to the second exemplary embodiment involves addition of the treatment liquid at a higher dosage rate of 3 to 5 times the standard dosage rate, this may increase the pH of the liquid to 8.5 or above, and at such pH much of the $H_2S$ and other sulfur containing contaminants in the treated liquid may be converted to elemental sulfur, which precipitates out of the treated liquid. Further, the increased dosage rates in the treatment process according to the second exemplary embodiment will generally speed up the reaction rate for remediating the $H_2S$ in the petroleum liquid to some extent, which may be desired. Thus, by increasing the dosage rate of the treatment solution appropriately, e.g., from 2 to 5 times the standard dosage rate in the treatment process of the second embodiment, it is possible to more quickly remediate the petroleum based liquid and to cause some or most of the sulfur and other contaminants to precipitate out of the treated petroleum liquid in a desired form.

While the increased dosage rates will increase the amount of sodium in the treated liquid when NaOH is the primary hydroxide in the treatment solution, and may also cause some unreacted hydroxide(s) to remain in the treated liquid, this will generally not cause any significant problems or complications in relation to the treated liquids. Again, sodium is permitted in the treated liquid up to a level of 250 ppm. Further, a corrosion study was done on 1) crude oil containing 1000 ppm $H_2S$ and treated with an appropriate amount of the treatment solution according to the exemplary embodiment of the invention within the standard dosing range according to the first exemplary treatment process and on 2) the same crude oil treated with 2×, 3×, 4× and 5× the appropriate amount of the treatment solution according to the second exemplary treatment process. The variously treated samples of the crude oil did not cause any corrosion of A36 steel and 60-61 T6 aluminum.

Treatment of Contaminated Aqueous Solutions

The present inventors have found that a treatment solution according to the first exemplary embodiment of the present invention, i.e., an aqueous treatment solution including as a primary component 35-55 weight percent, and preferably at least 45 weight percent, of one or more hydroxides, such as sodium hydroxide (NaOH) and potassium hydroxide (KOH) in water, and possibly other components such as potassium silicate or barium in appropriate small amounts as discussed above which provide an antibacterial function, may also be used in processes for treating contaminated aqueous solutions including $H_2S$ as a primary contaminant be remediated, as well as other sulfur containing contaminants and other contaminants. The treatment processes for the aqueous solutions include essentially the same steps and considerations for establishing an appropriately controlled dosage amount s discussed above in relation to the treatment of petroleum based liquids. In the processes treating the aqueous solutions, the treatment solution, again, directly reacts with $H_2S$ and is very effective for remediating $H_2S$, other sulfur-contain contaminants and other contaminants in the aqueous liquids, provided that the dosage amount of the treatment solution is maintained within an appropriate range, which can vary depending of several factors including most of the same factors as discussed in relation to treatment of petroleum based liquids. However, viscosity of the aqueous solutions should not be an important factor that needs to be considered when determining an appropriate dosage rate of the treatment solutions as most contaminated aqueous solutions have very low viscosity, whereby the treatment solutions according to the present invention will readily migrate and disperse throughout the aqueous solutions at the standard dosage rates with or without agitating the aqueous solution. Again, the appropriate dosage amount is generally, linearly scalable in relation to each of the relevant factors. Thus, excluding considerations based on viscosity of the liquid being treated, an appropriate dosage amount of the treatment solutions according to the present invention to be used in a treatment process for treating either a petroleum based liquid or an aqueous liquid will be essentially the same provided the liquids contain the same amounts of $H_2S$, other sulfur compounds and other contaminants, the desired reaction rate for the treatment process is the same, and the desired outcome of the treatment process is the same in terms of whether the remediated contaminants are to remain in solution or are to be released from the treated liquid in particular form(s).

Thus, for example, if it is desired for the remediated H$_2$S, other sulfur compounds and other contaminants are to largely remain in the treated aqueous solution, an appropriate dosage amount of treatment solution according to the exemplary embodiment is, again, within the standard dosing rate of 0.25-6.0 ml, preferably 1.0-5.0 ml/liter of aqueous solution, with the most appropriate dosage rate within such range determined based on a matrix of considerations, including the amounts of H$_2$S and other specific contaminants contained in the particular aqueous solution and the desired reaction time permitted for reacting the treatment solution and the aqueous solution. On the other hand, if it is desired to cause the remediated H$_2$S, other sulfur compounds and other contaminants to be released from the treated liquid as precipitates, and also possible as gases, then the dosage amount may be appropriately increased within range of 2-5 times the standard dosing rate, i.e., 0.5-30.0 ml.

To any extent that an excessive dosage of treatment solution is added to the aqueous solution in the treatment process, this will typically not create any significant problems or complications, but this largely depends on what is done with the treated aqueous solution. For example, if the treated solution is to be discharged into a wastewater treatment system, for use in an industrial process as a cooling medium, or is to be used for watering vegetation, it may desirable or necessary to remove the soiree or all of sulfur of the remediated H$_2$S, other sulfur compounds and other contaminants from aqueous liquid. For such purposes, other compounds may be added to the treated liquid which cause the sulfur of the remediated H$_2$S, other sulfur compounds and other contaminants to flocculate and/or precipitate and be released from treated aqueous liquid. For example, ferric chloride (FeCl$_3$) and/or ionic polymers may be added to the treated aqueous liquids for such purpose.

One exemplary treatment process for treating a contaminated aqueous solution according to the present invention includes steps of includes steps of adding a standard dosage of the treatment solution according to the exemplary embodiment discussed above within a range of 0.25-6.0 ml/liter of the petroleum based liquid, preferably within a range of 1.0-5.0 ml/liter of the petroleum based liquid, and permitting the treatment solution to react with the petroleum based liquid for time period of 15 minutes-24 hours. While the amount of soluble and gaseous H$_2$S which can be in aqueous solutions is less than the amount which may be in petroleum based liquids, it still can be present in hundreds and thousands of ppm, and contaminated aqueous solutions will typically contains ≤1000 ppm H$_2$S. The discussed standard dosage amount in the exemplary embodiment of the treatment process according to the present invention is generally effective for H$_2$S up to 20,000 ppm, and hence the standard dosage amount will be appropriate for most contaminated aqueous solutions. The first exemplary treatment process may include additional steps of adding other components to cause flocculation or precipitation of undesired components remaining in the treated aqueous solution, as well as collecting, discharging and treating any precipitates and/or gases generated in and/or released from the treated aqueous solutions.

Also, the treatment process may be modified to adding an increased dosage amount of the treatment solution, e.g., within range of 2-5 times the standard dosing rate, if it is desired for the treatment solution to cause the remediated H$_2$S, other sulfur compounds and other contaminants to be released from the treated liquid as precipitates, and also possible as gases.

Another component which may be added to the treatment solution according to the exemplary embodiment of the present invention is sodium bisulfite (NaHSO$_3$). When added at a relatively low concentration, e.g., 0.001-0.05 ppm/liter of liquid being treated, sodium bisulfite is very effective for displacing dissolved gases such as methane contained in the aqueous solutions as these liquids are treated and transported via a tanker truck, pipeline or other manner, so that the displaced gas may be captured, collected and sold. This is, of course, very desirable and advantageous. Thus, for example, if contaminated wastewater produced or obtained when extracting methane—natural gas from a well contains 5% volume of methane—natural gas dissolved therein, this can represent a significant amount of methane—natural gas that may be recovered, and favorably increases the total production of the well. An aqueous solution of sodium bisulfite may be highly concentrated, e.g., 70-90% wt/wt, may be added to the exemplary treatment solutions according to the present invention at an appropriate rate to achieve a concentration of 0.001-0.05 ppm/liter of liquid being treated, While addition of sodium bisulfite may be particularly suitable for treating aqueous solutions, it may also be added to a treatment solution used for treating petroleum based liquids. Significantly, however, if sodium bisulfite is to be used in treating crude oil or other petroleum based liquids it should be added in hydrated form, whether in power or liquid, to function efficiently.

EXAMPLES OF TREATMENT PROCESSES ACCORDING TO THE PRESENT INVENTION

Example 1

The method according to the first exemplary embodiment of the present invention was used for treating crude oil (API viscosity 29°) containing approximately 1000 ppm H$_2$S as the primary contaminant and having a pH of 5.2. There were, of course, other contaminants in the crude oil, but these were not a significant concern in comparison to the H$_2$S. The treatment solution was prepared by combining 1 liter of NaOH aqueous solution at 50.5 weight percent, 10 ml of KOH aqueous solution at 45 weight percent, and 4 ml of potassium silicate aqueous solution at concentration of 40 weight percent potassium. Three ml of the treatment solution were added/liter of the crude oil, and dispersed therein with stirring at 100 rpm at a temperature of 25° C. while the treated liquid was exposed to air, which raised the pH of the crude oil to approximately 6.8. After one hour the treated crude oil was tested and showed 0 ppm H$_2$S with most of the H$_2$S, >90%, being converted to sodium bisulfite (NaHS) which remained in the treated crude oil, and some of the H$_2$S being converted into sulfur dioxide gas based on the d of air into the oil from stirring, some of which remained dissolved in the treated liquid and some of which was released. The other sulfur compounds besides H$_2$S and other contaminants in the crude oil also mostly remained in the treated crude oil after the treatment process as no significant amount of precipitate(s) were released from the treated crude oil. After 24 hours the treated crude oil separated into a main, upper petroleum layer and a much lower aqueous layer, and the petroleum layer was easily separated from the aqueous layer.

Example 2

The conditions in Example 2 were exactly the same as in Example 1 except that 6 ml, or double the standard dosage amount of 3 ml, of the treatment solution were added/liter of the crude oil, which raised the pH of the crude oil to approximately 7.7. Hence this Example falls under the second exemplary treatment process of the present invention. After one hour the treated crude oil was tested and showed 0 ppm $H_2S$ with most of the $H_2S$, >95%, being converted primarily to sodium sulfide ($Na_2S$) and to a much lesser extent elemental sulfur, both of which precipitated out the treated crude oil, and the balance of the $H_2S$ being converted into sulfur dioxide gas most of which was released from the treated crude oil. The other sulfur compounds besides $H_2S$ and other contaminants in the crude oil were also precipitated and released from the treated crude oil. The precipitates were separated from the treated crude oil for further processing, sale and/or disposal, and the treated crude oil containing 0 ppm $H_2S$ could be sold as sweet, high grade crude oil. The aqueous solution contain much of remaining NaOH, KOH, and sodium silicate was withdrawn from the treatment cell, and the NaOH, KOH, and sodium silicate were recovered therefrom.

Example 3

The conditions in Example 3 were exactly the same as in Example 1 except that 8 ml of the treatment solution were added/liter of the crude oil, which raised the pH of the crude oil to approximately 8.4. After one hour the treated crude oil was tested and showed 0 ppm $H_2S$ with most of the $H_2S$, >95%, being converted primarily to elemental sulfur in various forms ($S_2$, $S_4$, $S_6$, $S_8$) which precipitated out the treated crude oil, and the balance of the $H_2S$ being converted into sulfur dioxide gas most of which was released was released from the treated crude oil. The other sulfur compounds besides $H_2S$ and other contaminants in the crude oil were also precipitated and released from the treated crude oil. The precipitates were separated from the treated crude oil for further processing, sale and/or disposal, and the treated crude oil containing 0 ppm $H_2S$ could be sold as sweet, high grade crude oil. The aqueous solution contains much of the remaining NaOH, KOH, and sodium silicate was withdrawn from the treatment cell, and the NaOH, KOH, and sodium silicate were recovered therefrom.

Example 4

The method according to the first exemplary embodiment of the present invention was used for treating a contaminated aqueous solution containing approximately 800 ppm $H_2S$ as the primary contaminant and having a pH of 5.0. Again, there were other contaminates in the aqueous solution, but these were not a significant concern in comparison to the $H_2S$. Three ml of the treatment solution were added/liter of the aqueous solution and dispersed therein with stirring at 100 rpm at a temperature of 25° C., which raised the pH of the aqueous solution to approximately 6.6. After one hour the treated aqueous solution was tested and showed 0 ppm $H_2S$ with most of the $H_2S$, >90%, being converted to sodium bisulfite (NaHS) which remained in the treated crude oil, and the balance of the $H_2S$ being converted into sulfur dioxide gas, some of which remained dissolved in the treated liquid and some of which was released. Subsequently, an amount of ferric chloride ($FeCl_3$) was added to the treated aqueous solution and dispersed therein with stirring at 100 rpm, and after 1 hour the ferric chloride flocculated most of the sodium bisulfite and contaminants remaining in the aqueous solution and the flocculated materials precipitated and separated from the aqueous solution. The treated aqueous solution then had 0 $H_2S$ and sufficiently low concentrations of other contaminants remaining therein and was safely discharged to a wastewater treatment facility.

Other Treatment Processes Using the Treatment Solution

While a primary use of the treatment solution according to the present invention is for treating hydrocarbon based liquids and aqueous solutions to remove $H_2S$, other sulfur compounds and/or rag components therefrom as discussed in relation to the exemplary embodiments of the invention above, the treatment solution according to the present invention may also be used in other treatment processes. One such other use is for treating toxic and noxious gases, including $H_2S$ and $SO_2$, produced in various processes such as coal-burning electricity generating power plants, etc. The present inventors have found that the treatment solution according to the first exemplary embodiment of the present invention is appropriate for removing undesirable components from such gases via a bubbling type scrubbing process. Particularly, the present inventors have found that if the highly concentrated caustic solution is used at normal strength or perhaps diluted with an additional water down to 40-80% of normal strength, the treatment solution is very effective for removing undesirable components, including sulfur, from such gases via a bubbling type scrubbing process. These gases were and then scrubbed via a bubbling process in which the captured gases were bubbled through the treatment solution used in the first exemplary embodiment of the present invention which was diluted by 50 weight percent with additional water. Such scrubbing process again caused the sulfur in such gases to be transferred into aqueous scrubbing liquid, and after a sufficient amount of the contaminants accumulated in the treatment solution they precipitated out primarily as elemental sulfur in various forms ($S_2$, $S_4$, $S_6$, $S_8$).

The foregoing description is given for clearness of understanding only, and no unnecessary limitations should be understood therefrom, as modifications within the scope of the invention may be apparent to those having ordinary skill in the art and are encompassed within the scope of the invention.

We claim:

1. A stand-alone aqueous treatment solution for directly remediating hydrogen sulfide ($H_2S$) and other contaminants in liquids, the treatment solution consisting of:
   at least one hydroxide compound; and
   an antibacterial agent, wherein
   a collective concentration of the at least one hydroxide compound in the aqueous treatment solution is in a range of 35-55 weight percent,
   the antibacterial agent is at least one of a silicate compound and barium, and
   collectively the at least one hydroxide compound and water constitute at least 95 weight percent of the aqueous treatment solution.

2. The aqueous treatment solution according to claim 1, wherein the collective concentration of the at least one hydroxide in the aqueous solution is 45-55 weight percent.

3. The aqueous treatment solution according to claim 1, wherein the aqueous treatment solution contains at least two different hydroxide compounds.

4. The aqueous treatment solution according to claim 1, wherein the aqueous treatment solution contains sodium hydroxide (NaOH) and potassium hydroxide (KOH).

5. The aqueous treatment solution according to claim 1, wherein a silicate compound is the antibacterial agent and the silicate compound is added at a concentration of 0.1-2 weight percent in the aqueous treatment solution.

6. A treatment process for preparing a remediated liquid from a contaminated liquid originally containing more than 5 ppm hydrogen sulfide ($H_2S$), comprising steps of:
- preparing a stand-alone aqueous treatment solution consisting of water, at least one hydroxide compound and an antibacterial agent, in which a collective concentration of the at least one hydroxide compound in the aqueous treatment solution is in a range of 35-55 weight percent and collectively the at least one hydroxide compound and the water constitute at least 95 weight percent of the aqueous treatment solution;
- adding to the contaminated liquid an amount of the aqueous treatment solution sufficient to reduce a concentration of hydrogen sulfide in the contaminated liquid to ≤5 ppm based on stoichiometry of reactions between the at least one hydroxide compound and the hydrogen sulfide in the contaminated liquid; and
- dispersing the aqueous treatment solution in the contaminated liquid and allowing the aqueous treatment solution to react with the contaminated liquid for a period of time until a concentration of hydrogen sulfide in the contaminated liquid is reduced to ≤5 ppm due to the reactions between the at least one hydroxide compound and the hydrogen sulfide in the contaminated liquid.

7. The treatment process according to claim 6, wherein the amount of the aqueous treatment solution added to the contaminated liquid is within a range of 0.25-6.0 ml/liter of the contaminated liquid.

8. The treatment process according to claim 7, wherein the contaminated liquid is a petroleum based liquid, and the amount of the aqueous treatment solution added to the contaminated liquid is adjusted within the range of 0.25-6.0 ml/liter of the contaminated liquid based on at least one of the concentration of hydrogen sulfide in the contaminated liquid; a desired reaction time for reducing the concentration of hydrogen sulfide in the contaminated liquid to ≤5 ppm; and a viscosity of the contaminated liquid.

9. The treatment process according to claim 7, wherein the contaminated liquid is a an aqueous solution, and the amount of the aqueous treatment solution added to the contaminated liquid is adjusted within the range of 0.25-6.0 ml/liter of the contaminated liquid based on at least one of the concentration of hydrogen sulfide in the contaminated liquid and a desired reaction time for reducing the concentration of hydrogen sulfide in the contaminated liquid to ≤5 ppm.

10. The treatment process according to claim 7, wherein the treatment process comprises an further step of adding to the contaminated liquid an additional amount of the aqueous treatment solution to cause a precipitate containing sulfur to be generated from the treated, contaminated liquid.

11. The treatment process according to claim 6, wherein the amount of the aqueous treatment solution added to the contaminated liquid is within a range of 1.0-5.0 ml/liter of the contaminated liquid.

12. The treatment process according to claim 6, wherein the dispersing step involves at least one of: allowing the aqueous treatment solution to migrate and disperse through the contaminated liquid; heating the contaminated liquid; and mixing the treatment solution into the contaminated liquid.

13. The treatment process according to claim 6, wherein collectively the at least one hydroxide compound and water constitute at least 98 weight percent of the aqueous treatment solution.

14. The treatment process according to claim 6, wherein the collective concentration of the at least one hydroxide in the aqueous treatment solution is 45-55 weight percent.

15. The treatment process according to claim 6, wherein the antibacterial agent includes at least one of a silicate compound and barium, and the antibacterial agent is added at a concentration of 0.1-2 weight percent in the aqueous treatment solution.

16. The treatment process according to claim 6, wherein the aqueous treatment solution contains at least two different hydroxide compounds.

17. The treatment process according to claim 6, wherein the amount of the aqueous treatment solution added to the contaminated liquid is within a range of 0.25-30.0 ml/liter of the contaminated liquid, and within said range the amount of the aqueous treatment solution added is based on whether it is desired to cause a precipitate containing sulfur is to be generated in the treated, contaminated liquid and a type of the precipitate containing sulfur desired to be generated.

18. The treatment process according to claim 17, wherein when it is desired to cause a precipitate containing sulfur is to be generated in the treated, contaminated liquid the amount of the aqueous treatment solution added to the contaminated liquid is within a range of 6.0-30.0 ml/liter of the contaminated liquid.

* * * * *